United States Patent
Becker et al.

(10) Patent No.: US 10,920,539 B2
(45) Date of Patent: Feb. 16, 2021

(54) NITSCHE CONTINUITY ENFORCEMENT FOR NON-CONFORMING MESHES

(71) Applicants: Gauthier D. Becker, The Woodlands, TX (US); Hao Huang, The Woodlands, TX (US); Huafei Sun, Houston, TX (US)

(72) Inventors: Gauthier D. Becker, The Woodlands, TX (US); Hao Huang, The Woodlands, TX (US); Huafei Sun, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 389 days.

(21) Appl. No.: 15/832,362

(22) Filed: Dec. 5, 2017

(65) Prior Publication Data

US 2018/0245435 A1    Aug. 30, 2018

Related U.S. Application Data

(60) Provisional application No. 62/463,306, filed on Feb. 24, 2017.

(51) Int. Cl.
*G06F 30/23* (2020.01)
*G01V 99/00* (2009.01)
(Continued)

(52) U.S. Cl.
CPC .......... *E21B 41/0092* (2013.01); *E21B 47/10* (2013.01); *G01V 99/005* (2013.01);
(Continued)

(58) Field of Classification Search
None
See application file for complete search history.

(56) References Cited

U.S. PATENT DOCUMENTS 8,190,414 B2 * 5/2012 Huang ............... E21B 43/00
703/10
8,289,322 B1 * 10/2012 Staten ............... G06T 17/205
345/423

(Continued)

OTHER PUBLICATIONS

Abedi et al., "Spacetime Damage-Delay Cohesive Model for Elastodynamic Fracture with Riemann Contact Conditions", IV European Conference on Computational Mechanics (ECCM2010) (May 15-21, 2010), pp. 1-2.

(Continued)

*Primary Examiner* — Kibrom K Gebresilassie
(74) *Attorney, Agent, or Firm* — ExxonMobil Upstream Research Company—Law Department

(57) ABSTRACT

A method for modeling a subsurface reservoir system, the method including: generating, with a computer, a background mesh that does not honor at least one subsurface feature included in the subsurface reservoir system; splitting, with a computer, the background mesh along the subsurface feature included in the subsurface reservoir system such that a resulting mesh honors a geometry of the subsurface features; identifying, with a computer, element faces or edges where the resulting mesh is non-conforming and/or the element faces or edges lie on subsurface features; and performing a computer-based numerical simulation utilizing the resulting mesh to model at least one fluid-related or geomechanical reservoir response, wherein mass or traction balance is enforced on the identified element faces or edges.

16 Claims, 5 Drawing Sheets

(51) Int. Cl.
*E21B 41/00* (2006.01)
*E21B 47/10* (2012.01)
*E21B 43/26* (2006.01)
*E21B 49/00* (2006.01)
*G06F 111/10* (2020.01)
*G06F 30/20* (2020.01)

(52) U.S. Cl.
CPC .............. *G06F 30/23* (2020.01); *E21B 43/26* (2013.01); *E21B 49/00* (2013.01); *G01V 2210/642* (2013.01); *G01V 2210/66* (2013.01); *G06F 30/20* (2020.01); *G06F 2111/10* (2020.01)

(56) References Cited

U.S. PATENT DOCUMENTS

| | | | | |
|---|---|---|---|---|
| 8,390,620 | B1* | 3/2013 | Staten | G06T 17/20 345/423 |
| 10,107,938 | B2* | 10/2018 | Huang | G06T 17/05 |
| 2002/0120430 | A1* | 8/2002 | Yang | G06T 17/20 703/2 |
| 2009/0306947 | A1* | 12/2009 | Davidson | E21B 43/00 703/2 |
| 2010/0045663 | A1* | 2/2010 | Chen | G06T 7/11 345/419 |
| 2012/0059629 | A1* | 3/2012 | Hashima | G06F 30/20 703/1 |
| 2012/0203512 | A1* | 8/2012 | Shahpar | G06T 17/20 703/1 |
| 2013/0218539 | A1* | 8/2013 | Souche | G06F 30/20 703/2 |
| 2013/0238297 | A1* | 9/2013 | Lepage | G09B 23/40 703/2 |
| 2015/0066460 | A1* | 3/2015 | Klinger | G06F 30/23 703/2 |
| 2016/0124117 | A1* | 5/2016 | Huang | G06T 17/05 703/2 |
| 2017/0315249 | A1* | 11/2017 | Myers | G06F 30/23 |
| 2018/0031719 | A1* | 2/2018 | Huang | G01V 99/005 |
| 2018/0113235 | A1* | 4/2018 | Laverne | G01V 99/005 |
| 2018/0120478 | A1* | 5/2018 | Imhof | G01V 99/005 |
| 2018/0217283 | A1* | 8/2018 | Klinger | G01V 99/005 |
| 2018/0322232 | A1* | 11/2018 | Klinger | G01V 99/005 |

OTHER PUBLICATIONS

Abedi et al., "An adaptive spacetime discontinuous galerkin method for cohesive models of elastodynamic fracture", International Journal for Numerical Methods in Engineering vol. 81, Issue 10 (2010), pp. 1207-1241.

Abedi et al., "A space-time discontinuous galerkin methods for linearized elastodynamics with element-wise momentum balance", Computer Methods in Applied Mechanics and Engineering vol. 195, Issues 25-28 (2006), pp. 3247-3273.

Annavarapu et al., "A nitsche stabilized finite element methods for frictional sliding on embedded interfaces. Part II: Intersecting interfaces", Computer Methods in Applied Mechanics and Engineering vol. 267 (2013), pp. 318-341.

Annavarapu et al., "A nitsche stabilized finite element method for frictional sliding on embedded interfaces. Part I: Single interface", Computer Methods in Applied Mechanics and Engineering vol. 268 (2014), pp. 417-436.

Annavarapu et al., "A weighted Nitsche stabilized method for small-sliding contact on frictional surfaces", Computer Methods in Applied Mechanics and Engineering vol. 283 (Jan. 1, 2015), pp. 763-781.

Arnold, "An interior penalty finite element method with discontinuous elements", SIAM Journal on Numerical Analysis vol. 19, Issue 4 (1982), pp. 742-760.

Baker, "Finite element methods for elliptic equations using nonconforming Elements", Mathematics of Computation vol. 31 (1977), pp. 45-59.

Becker, "Numerical simulations of brittle and elasto-plastic fracture for thin structures subjected to dynamic loadings/Simulations numeriques de la rupture fragile et elasto-plastique de structures minces sous chargements dynamiques", PhD thesis, 2012.

Becker et al., "A full discontinuous galerkin formulation of non-linear kirchhov-love shells: elasto-plastic finite deformations, parallel computation & fracture applications", International Journal for Numerical methods in Engineering (published 2012), 93, pp. 80-117.

Becker et al., "Validation tests of the full discontinuous galerkin / extrinsic cohesive law framework of Kirchhoff-Love shell", International Journal of Fracture CFRAC2011, Nov. 2012, vol. 178, Issues 1-2, pp. 299-322.

Bernardi et al., "Asymptotic and Numerical Methods for Partial Differential Equations with Critical Parameters", Kaper, Garbey, Pieper—Eds., NATO ASI Series, Series C: Mathematical and Physical Sciences, vol. 384 (1993), pp. 1-372.

Bernardi et al., "Coupling finite element and spectral methods: First results", Mathematics of Computation vol. 54, No. 189 (Jan. 1990), pp. 21-39.

Bey et al., "hp-Version discontinuous Galerkin methods for hyperbolic conservation laws", Computer Methods in Applied Mechanics and Engineering vol. 133, Issues 3-4 (Jul. 1, 1996), pp. 259-286.

Brezzi et al., "Mixed and Hybrid Finite Element Methods", Springer-Verlag New York, Inc., New York, NY, USA, 1991, pp. 78-87; 135-154; and 167-205.

Cockburn, "Discontinuous Galerkin methods", ZAMM—Journal of Applied Mathematics and Mechanics / Zeitschrift fur Angewandte Mathematik und Mechanik 83, 11 (2003), pp. 731-754.

Cockburn et al., "Runge-kutta Discontinuous Galerkin Methods for Convection-Dominated Problems", Journal of Scientific Computing vol. 16, Issue 3, Sep. 2001, pp. 173-261.

Douglas, "H1-galerkin methods for a nonlinear dirichlet problem", Mathematical Aspects of Finite Element Methods, I. Galligani and E. Magenes, Eds., vol. 606 of Lecture Notes in Mathematics, Springer Berlin / Heidelberg, 1977, pp. 64-86.

Douglas et al., "Interior penalty procedures for elliptic and parabolic galerkin methods", Computing Methods in Applied Sciences, R. Glowinski and J. Lions, Eds., vol. 58 of Lecture Notes in Physics, Springer Berlin / Heidelberg, 1976, pp. 207-216.

Engel et al., "Continuous/discontinuous finite element approximations of fourth-order elliptic problems in structural and continuum mechanics with applications to thin beans and plates, and strain gradient elasticity", Computer Methods in Applied Mechanics and Engineering, vol. 191, Issue 34 (2002), pp. 3669-3750.

Hansbro et al., "A discontinuous Galerkin method for the plate equation", Calcolo, vol. 39, Issue 1 (2002), pp. 41-59.

Houston et al., "An hp-adaptive mixed discontinuous Galerkin FEM for nearly incompressible linear elasticity", Computer Methods in Applied Mechanics and Engineering vol. 195, Issues 25-28 (2006), pp. 3224-3246.

Mergheim et al., "A hybrid discontinuous Galerkin/interface method for the computational modelling of failure", Communications in Numerical Methods in Engineering, vol. 20, Issue 7 (2004), pp. 511-519.

Molari et al., "A discontinuous galerkin method for strain gradient-dependent damage: Study of interpolations and convergence", Computer Methods in Applied Mechanics and Engineering, vol. 195, Issues 13-16 (2006), pp. 1480-1498.

Nitsche, "Uber ein Variationsprinzip zur Losung von Dirichlet-Problemen bei Verwendung von Teilraumen", die keinen Randbedingungen unterworfen sind, Abh. Math. Sem. Univ. Hamburg 36 (1971), pp. 9-15.

Noels, "A discontinuous galerkin formulation of non-linear Kirchhoff-Love shells", International Journal for Numerical Methods in Engineering, vol. 78, Issue 3 (2009), pp. 296-323.

Noels et al., "A new discontinuous Galerkin method for Kirchhoff-Love shells", Computer Methods in Applied Mechanics and Engineering, vol. 197, Issues 33-40 (2008), pp. 2901-2929.

(56) References Cited

OTHER PUBLICATIONS

Percell et al., "A local residual finite element procedure for elliptic equations", SIAM Journal on Numerical Analysis, vol. 15, No. 4 (1978), pp. 705-714.
Pian et al., "Basis of finite element methods for solid continua", International Journal for Numerical Methods in Engineering, vol. 1, Issue 1 (1969), pp. 3-28.
Prechtel et al., "Simulation of fracture in heterogeneous elastic materials with cohesive zone models", International Journal of Fracture, vol. 168, Issue 1 (2011), pp. 15-29.
Radovitzky et al., "A scalable 3D fracture and fragmentation algorithm based on a hybrid, discontinuous Galerkin, cohesive element method", Computer Methods in Applied Mechanics and Engineering vol. 200, Issues 1-4 (Jan. 1, 2011), pp. 326-344.
Reed et al., "Triangular mesh methods for the neutron transport equation", In Conference: National topical meeting on mathematical models and computational techniques for analysis of nuclear systems, Ann Arbor, Michigan, USA, Apr. 8, 1973; Other Information: Orig. Receipt Date: Dec. 31-73, 1973.
Seagraves et al., "Chapter 12, Advances in Cohesive Zone Modeling of Dynamic Fracture", in Dynamic Failure of Materials and Structures, A. Shukla, G. Ravichandran, and Y. D. Rajapakse, Eds. Springer US, 2010, pp. 349-405.
Truster et al., "Finite strain primal interface formulation with consistently evolving stabilization", International Journal for Numerical Methods in Engineering vol. 102, Issues 3-4 (Apr. 20-27, 2015), pp. 278-315.
Truster et al., "Primal interface formulation for coupling multiple PDEs: A consistent derivation via the Variational Multiscale method", Computer Methods in Applied Mechanics and Engineering vol. 268 (Jan. 1, 2014), pp. 194-224.
Wells et al., "A $C^0$ discontinuous Galerkin formulation for Kirchhoff plates", Computer Methods in Applied Mechanics and Engineering vol. 196, Issues 35-36 (Jul. 15, 2007), pp. 3370-3380.
Wells et al., "A discontinuous Galerkin formulation for a strain gradient-dependent damage model", Computer Methods in Applied Mechanics and Engineering vol. 193, Issues 33-35 (Aug. 20, 2004), pp. 3633-3645.
Wheeler, "An elliptic collocation-finite element method with interior penalties", SIAM Journal on Numerical Analysis vol. 15, Issue 1 (1978), pp. 152-161.

* cited by examiner

NITSCHE CONTINUITY ENFORCEMENT FOR NON-CONFORMING MESHES

CROSS REFERENCE TO RELATED APPLICATION

This application claims the benefit of U.S. Provisional Application Ser. No. 62/463,306, filed Feb. 24, 2017 titled "Nitsche Continuity Enforcement for Non-Conforming Meshes," the disclosure of which is incorporated herein by reference in its entirety.

TECHNOLOGICAL FIELD

Exemplary embodiments described herein pertain generally to the field of hydrocarbon exploration, development, and production, and more particularly to the field of subsurface modeling. Exemplary embodiments relate to the modeling of subsurface domains having features such as fractures, faults, horizons, perforations, wormholes, and wellbores that may affect reservoir behavior.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

The production of hydrocarbons such as oil and gas has been performed for numerous years and in many locations worldwide. To help with making decisions regarding drill locations, well and completion design, facility capacities, various types of numerical simulations are often performed to evaluate different options and optimize the decision. For example, practitioners may rely on elastic wave modeling and inversion to predict the subsurface stratigraphy. They may also use reservoir flow simulation to analyze the potential production history of a particular choice of well location and completion design. In another example, they may use a geomechanical model to analyze fault activation due to production, and estimate the risk of induced seismicity or casing failure.

All aforementioned simulations are oftentimes based on mathematical formulations that are assumed to govern the interrelationship of various numerical values in a reservoir. These values may represent fluid and fluid flow responses such as formation pore pressure, rock porosity, formation permeability and temperature. These values may also be geomechanical responses such as stress or rock deformation.

Numerical methods are oftentimes employed in these models. Such methods include the finite element method, the discontinuous Galerkin method, and finite volume method. These methods provide an approximate numerical solution to complex differential equations which govern the behavior of the reservoir under a given set of conditions. In a numerical method, a geological system under study is defined by a finite number of individual sub-regions or elements. Creating the elements entails gridding or "meshing" the formation. A mesh is a collection of elements that fill a space, with the elements being representative of a system which resides in that space. The process of dividing a production area under study into elements may be referred to as "discretization" or "mesh generation."

In a numerical subsurface model, it is conventionally important to construct a mesh honoring the geometrical shape of the formation under analysis. This means that the elements honor the geometry of the formation. However, mesh generation is challenged by the presence of subsurface features. In this respect, hydrocarbon reservoirs under production typically contain various forms of natural or man-made subsurface features. Examples of natural subsurface features include faults, natural fractures and formation stratification. Examples of man-made features include perforations from wellbores, fracture wings of a fractured wellbore completion, and wormholes due to acid injection activities. These features create discontinuities that affect reservoir behavior.

Numerical simulation in a subsurface is also challenged where high gradients of reservoir properties exist. An example of a subsurface feature that presents a high gradient is a wellbore. The wellbore, when viewed as a singular line source or sink for pore pressure, can cause high pressure gradients in the near-well region. Fluid flow and pressure gradients that exist radially around a wellbore are steep. Modeling such gradients generally requires the use of a high density mesh.

Yet another problem with mesh generating solutions relates to the fact that man-made subsurface structures will change over the life of a reservoir. Evolving subsurface features include newly formed wellbores, wormhole growth or injection-induced fracture growth. Such features require the mesh or grid to evolve accordingly to accommodate the varying geometry of subsurface features. During this mesh evolution process, parameter values which have been stored at nodes or element locations need to be mapped into the appropriate locations in the new mesh. This process may result in loss of precision.

U.S. Pat. No. 8,190,414 B2, the entirety of which is hereby incorporated by reference, documented a process which enables subsurface simulation without having to construct a mesh explicitly honoring the subsurface geometries. However, the proposed method is tied to a finite element method, which may not be a suitable method for some types of subsurface simulation due to accuracy and stability reasons.

SUMMARY

A method for modeling a subsurface reservoir system, the method including: generating, with a computer, a background mesh that does not honor at least one subsurface feature included in the subsurface reservoir system; splitting, with a computer, the background mesh along the subsurface feature included in the subsurface reservoir system such that a resulting mesh honors a geometry of the subsurface features; identifying, with a computer, element faces or edges where the resulting mesh is non-conforming and/or the element faces or edges lie on subsurface features; and performing a computer-based numerical simulation utilizing the resulting mesh to model at least one fluid-related or geomechanical reservoir response, wherein mass or traction balance is enforced on the identified element faces or edges.

In the method, the non-conforming mesh can be generated from the splitting of the background mesh.

The method can further include performing surface integration to ensure mass or traction balance on the identified element faces or edges, and the surface integration can be performed by separating the surface integration of an interface between two sides of the identified element faces or edges into two parts, one for each side of the interface, and on each side of the interface, the surface integration can follow its own discretization without any considerations for the other side's discretization.

In the method, the non-conforming mesh can include at least one hanging node on different sides of the interface, and at the identified element faces or edges the integration can be performed in order to account for a presence of the at least one hanging node.

The method, after the splitting, can include inserting additional elements with different material properties between two sides of a split in the resulting mesh at a surface of the subsurface feature The method, after the splitting, can include inserting additional elements with different material properties within the resulting mesh at a location of a one-dimensional subsurface feature.

In the method, the material properties can be permeability and porosity for a fluid flow problem, and constitutive relations for a geomechanical problem.

In the method, the at least one fluid-related reservoir response can be determination of fluid flow through a permeable rock formation.

In the method, the subsurface feature can be at least one of a perforation from a wellbore, fracture wings of a fractured wellbore completion, or wormholes.

In the method, the subsurface feature can be at least one of a fault, natural fractures, or formation stratification.

In the method, the simulation can account for a discontinuity at the identified edges or faces with a Nitsche method.

The method can include managing hydrocarbons based on a result of the simulation.

In the method, the interface can be between high and low permeability regions of source rock.

In the method, the splitting can be according to subsurface features.

In the method, the splitting can according to local grid refinement.

A non-transitory computer readable storage medium encoded with instructions, which when executed by a computer causes the computer to implement a method for modeling a subsurface reservoir system, the method including: generating, with a computer, a background mesh that does not honor at least one subsurface feature included in the subsurface reservoir system; splitting, with a computer, the background mesh along the subsurface feature included in the subsurface reservoir system such that a resulting mesh honors a geometry of the subsurface features; identifying, with a computer, element faces or edges where the resulting mesh is non-conforming and/or the element faces or edges lie on subsurface features; and performing a computer-based numerical simulation utilizing the resulting mesh to model at least one fluid-related or geomechanical reservoir response, wherein mass or traction balance is enforced on the identified element faces or edges.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

In light of the shortcomings noted in the Background Section, the inventors have recognized that a need exists for an improved numerical method that can closely capture the effects on modeling introduced by subsurface features, that a need exists for an improved method for modeling a reservoir that allows a computational mesh to remain unaltered regardless of varying geometries of subsurface features, and that a need exists for a method for modeling reservoir response in a subsurface system wherein the mesh is created within physical boundaries that need not honor the geometry of a subsurface feature. The present technological advancement can address the above-noted needs.

A non-limiting example of the present technological advancement is a method that includes: (1) constructing a background mesh that does not honor the geometry of the subsurface features; (2) splitting elements of the mesh along features; (3) numerically treating unconforming meshes that arise from the element splitting; and (4) performing a simulation on a newly generated mesh.

Figure 1:
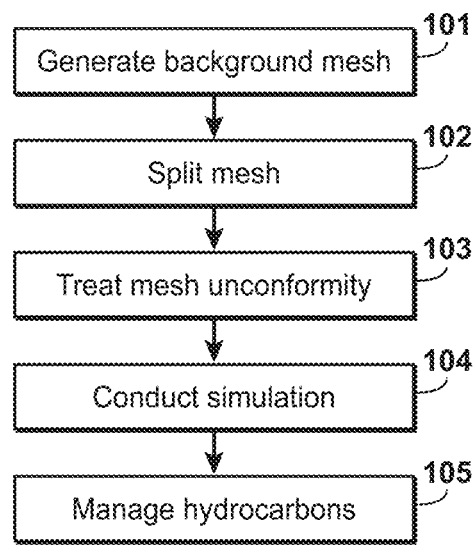
FIG. 1 illustrates an exemplary method of the present technological advancement.

FIG. 1 illustrates an exemplary method of the present technological advancement.

Figure 2:
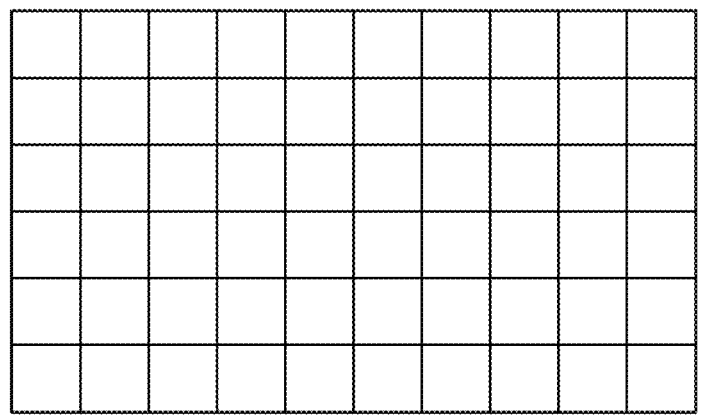
FIG. 2 illustrates an example of a background mesh.

In step 101, a background mesh is generated. The background mesh can be developed in the modeling domain. The background mesh might not conform to the subsurface features. An example of a background mesh is illustrated in FIG. 2, wherein each square is an element of the mesh.

Figure 3:
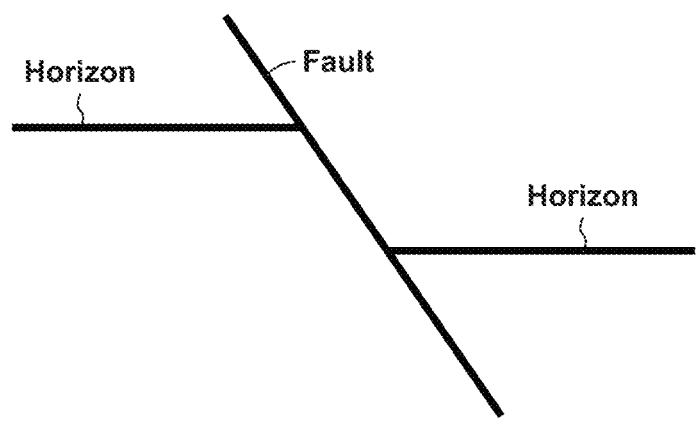
FIG. 3 illustrates an example of a horizon split by a fault.
Figure 4:
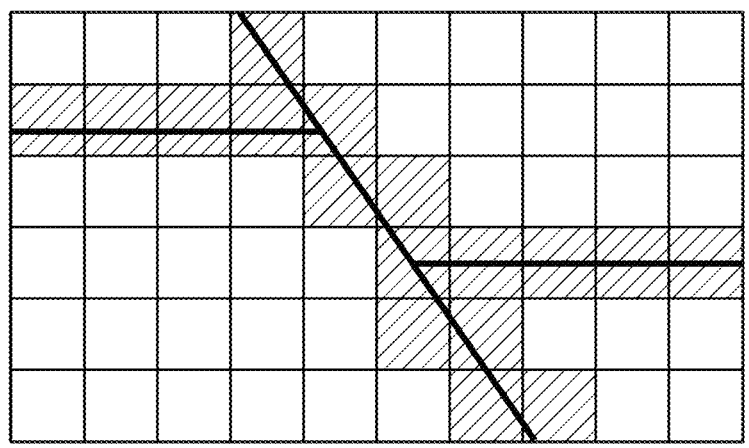
FIG. 4 illustrates the subsurface features of FIG. 3 imposed upon the background mesh of FIG. 2.
Figure 5:
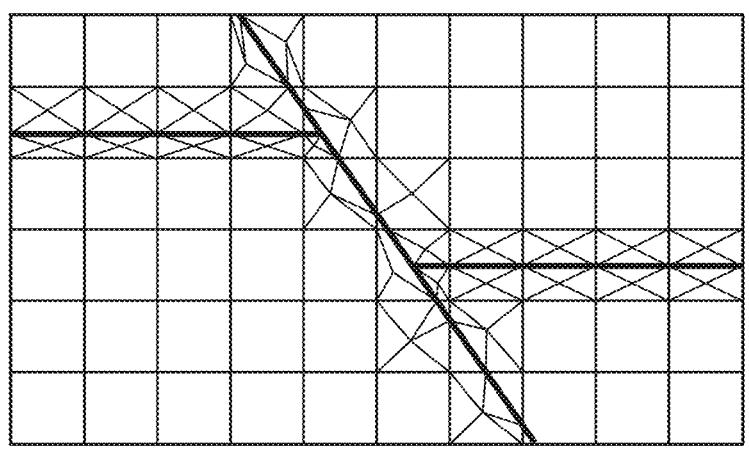
FIG. 5 illustrates elements of FIG. 4 split into triangular elements.

In step 102, elements in the background mesh that are intersected by subsurface features are split along the subsurface features. This is exemplified in FIG. 3. In this example, a horizon and a fault are both presented in the system. The horizon is offset by a fault. FIG. 4 illustrates the subsurface features of FIG. 3 imposed upon the background mesh of FIG. 2. The elements marked by gray color are intersected by at least one of the two subsurface features. These elements can be split along the subsurface features into multitude of polyhedra (or polygon in 2D). If the ensuing numerical simulation can handle polyhedra (or polygonal elements in 2D), for example the finite volume method, no further split is needed. However, if the ensuing numerical method has difficulty dealing with general polyhedron, for example in the finite element method, the polyhedra are further split into tetrahedral, pyramid, or hexahedral elements (or triangular or quadrilateral elements in 2D). In this example, elements are split into triangular elements as illustrated in FIG. 5. Those of ordinary skill in the art are familiar with methods that can be used to split an element. Examples of such methods are discussed in Provisional patent application 62/368,595, the entirety of which is hereby incorporated by reference.

Figure 6:
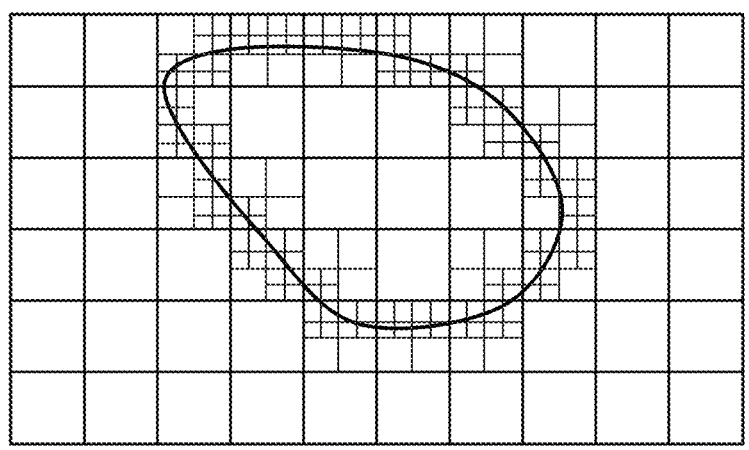
FIG. 6 illustrates an example of local refinement around the boundary of a geobody.

Sometimes, local refinement may be performed before splitting. FIG. 6 illustrates an example of local refinement around the boundary of a geobody. The elements of the background mesh that are intersected by the boundary are further refined. This allows the use of a larger size element away from the boundary, which leads to smaller number of elements.

Figure 7A:
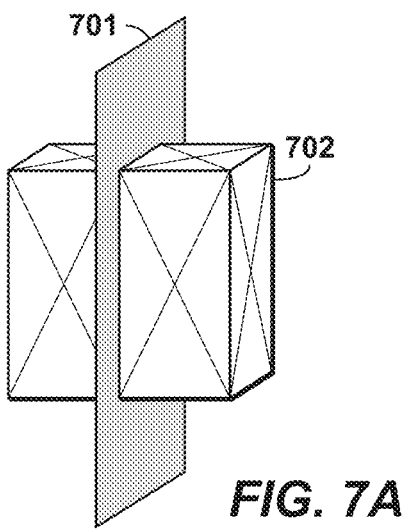
FIGS. 7A, B, C, D, E, and F illustrate examples of the creation of elements to model behaviors inside a subsurface feature.
Figure 7B:
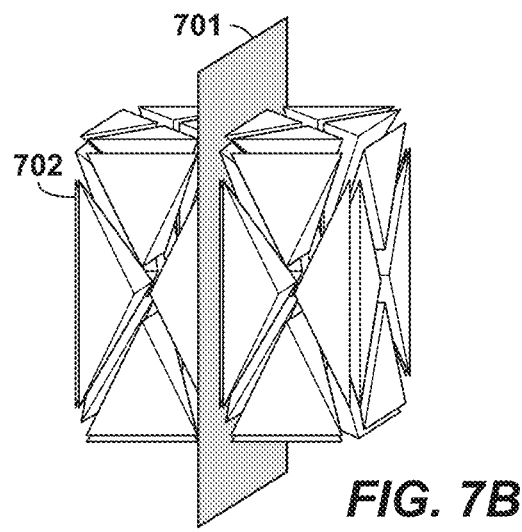
Figure 7C:
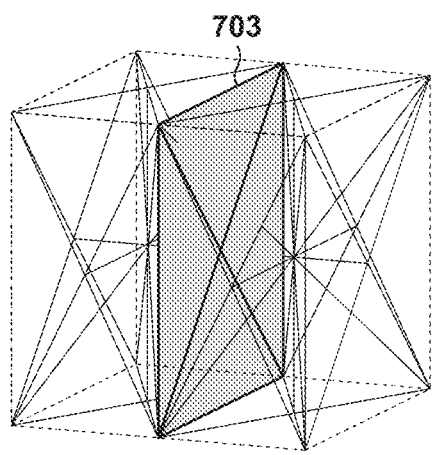
Figure 7D:
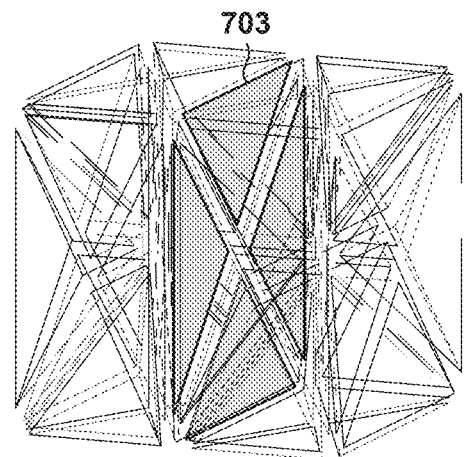
Figure 7E:
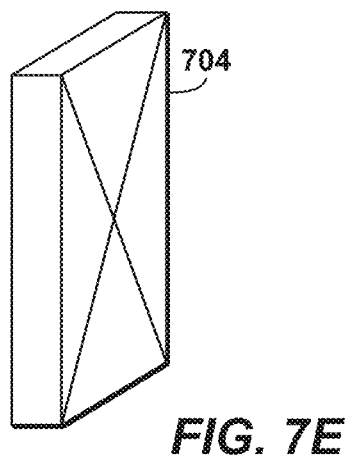
Figure 7F:
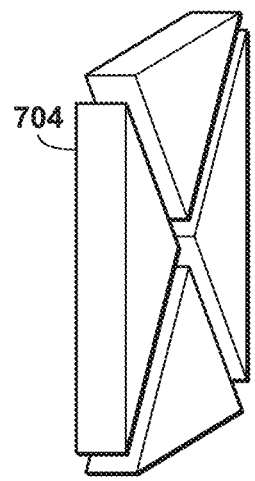

In another embodiment, elements can be added on the subsurface features to model behaviors inside the feature. For example, in porous media flow problem, if the subsurface features are fractures or faults, and have different permeability than the rock, one can insert fracture or fault elements to connect the children elements on the two sides of the features. In the simulation, the fault or fracture elements will be assigned with different permeability than the rock. Similar treatment can also be done for faults or fractures in geomechanical problems. FIGS. 7A-F illustrate the creation of such elements. In FIG. 7A, a subsurface feature 701 is cut by a hexahedron 702, which is split into several tetrahedrons (exploded view in FIG. 7B). FIG. 7C illustrates that a mesh/geometric representation of the subsurface feature 703 is dimension −1 (i.e., 2D for a 3D problem and 1D for a 2D problem). FIG. 7D is an exploded view of FIG. 7C. For computation, the subsurface feature 704 is considered with a full dimension, i.e., a dimension +1 compared with its geometric representation (i.e., 3D for 3D problem and 2D for 2D problem) (see FIG. 7E). FIG. 7F is an exploded view of FIG. 7E.

In case the subsurface features are not surface features, but have elongated geometry, e.g. wells, perforations, or wormholes, one can approximate the features with a 3D curve and it will lie on element edges of children elements after splitting. For computation, these types of features are considered with full dimension, i.e., a dimension +2 compared with its geometric representation.

Figure 8:
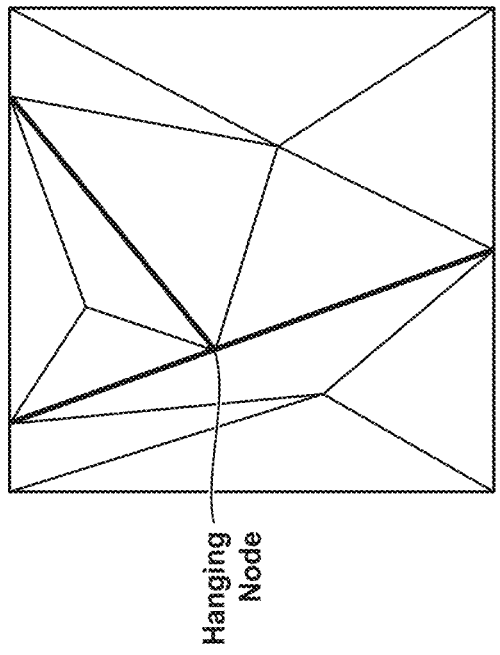
FIG. 8 illustrates an example of mesh unconformity.
Figure 8:
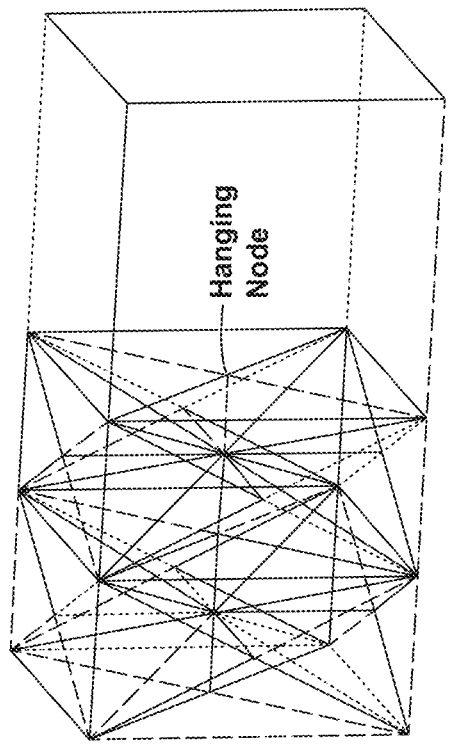
Figure 9B:
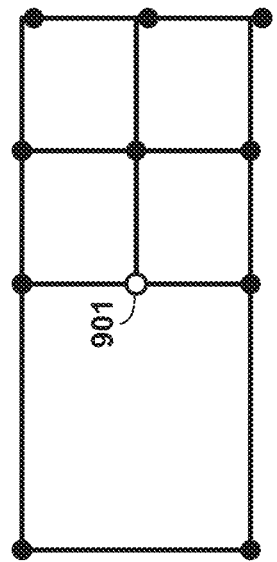
FIGS. 9A and 9B illustrate a contrast between a conforming mesh and a non-conforming mesh that presents a hanging node.
Figure 9A:
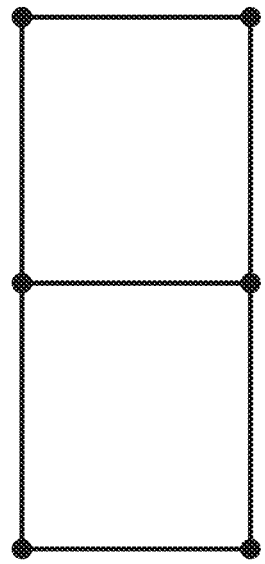

In step 103, mesh unconformity resulting from the element splitting will be treated. Creating a mesh that handle the discontinuity creates hanging nodes. Examples of mesh unconformity are shown in FIG. 8, via the hanging node. In the left figure, one of the two elements is split into tetrahedral elements. The discretization of the common shared face is not the same viewed from left and right side. In the right figure, two fractures are intersected and the left fracture has different discretization on the two sides of itself. FIGS. 9A and 9B illustrate a simpler contrast between a conforming mesh and a non-conforming mesh that presents a hanging node 901. With a conforming mesh, the vertices are shared with their other neighboring elements, but the hanging node in FIG. 9B is not. In 2D, a hanging node occurs when one of the cells sharing a face is divided and the other is not, as shown in FIGS. 9A and 9B. For two quad cells, one cell is divided into four quads and the other remains as it is. This leads to a node on the face between two cells that does not properly belong to both of the cells. The node "hangs" on the face, and one of the cells becomes an arbitrary polyhedron.

In step 104, a computer-based numerical simulation is performed utilizing the non-conforming mesh to model at least one fluid-related reservoir response. The simulation can account for the discontinuity in the non-conforming mesh by separating surface integration of the interface between the two elements of the non-conforming mesh into two parts using a modified Nitsche method, multipoint constraint or penalty method, with one part for each side of the interface. On each side of the interface, the surface integration follows its own discretization without any considerations for the other side's discretization. By way of example, the interface can be between high and low permeability regions of source rock.

It is desirable to perform computer modeling on hydrocarbon reservoirs in order to simulate and predict fluid flow through a permeable rock formation and recovery from producer wells. Such simulations are oftentimes based on mathematical formulations that are assumed to govern the interrelationship of various numerical values in a reservoir. These values may represent fluid and fluid flow responses such as formation pore pressure, rock porosity, formation permeability and temperature. These values may also be geomechanical responses such as stress or rock deformation.

The present technological advancement is based on the Nitsche method (or Discontinuous Galerkin method) that allows accounting for discontinuities in the discretization by considering the interfaces contribution to the problem equations. The Nitsche method is well developed in the literature for conforming meshes. The present technological advancement extends the Nitsche method to non-conforming interfaces by separating the surface integration in two parts, using one part for each side of the interface. On each side of the non-conforming interface the integration follows its own discretization without any considerations for the other side's discretization. The needed quantities on the other side are just evaluated at the spatial location, which may not correspond to an integration point. This separation of the integration allows preserving (weakly) the continuity of the equations, for example the mass or traction balance is ensured, which is an improvement to other techniques currently employed with non-conforming meshes, such as pure penalty method or multi-point constraint.

The main feature of Nitsche methods is their ability to take into account discontinuities in the interior domain. In these methods, the integration by parts takes place element by element leading to interface terms which can be used to ensure weakly the continuity. In fact, in the Nitsche method the virtual variational field (or test functions) are only required to be continuous inside an element while its intra element continuity is weakly ensured through additional interface terms. By contrast, classical finite elements (FE) require the continuity of the virtual variational field through element boundaries.

Historically, the first Nitsche methods were introduced to study hyperbolic equations where discontinuities and numerical fluxes are naturally present in the exact solution. A complete review of the use of Nitsche methods for hyperbolic equations can be found in [16, 17]. As an example, the first one was suggested by W. Reed et al. [32], who focused on the transport of neutrons. A subsequent work by J. Nitsche [25] uses this technique to prescribed weak boundary conditions and a major contribution in this work was the incorporation in the formulation of a quadratic term to stabilize the method, a basis for subsequent works and explaining the name "Nitsche methods".

For elliptic problems, such as continuum mechanics ones, the use of Nitsche methods seems, at first sight, useless as it considers more degrees of freedom to solve a problem than a classical Finite Elements approach. Therefore, the early works focused on ensuring weakly the high order continuity. Indeed, in the beginning of the seventies some authors [7, 8, 18, 19, 28, 38] generalized the hybrid method of T. Pian et al. [29] to enforce the C1 continuity between elements for fourth order elliptic equations of thin body formulations. Nevertheless, after these initial developments, the interest for this technique vanished to the benefit of the method combining displacement and rotation [15], until G. Engel et al. [20] suggested a new framework coupling conjugate gradient (CG) and Nitsche methods. Extending the past idea [7, 8, 18, 19, 25, 28, 38], they obtained a one-field formulation of Euler-Bernoulli beams and Kirchhoff plates. The use of C0 shape functions allows having recourse to continuous elements and the Nitsche method is used at element interfaces to ensure in a weak manner the C1 continuity. Some improvements were brought by several authors [21, 36], who also applied the technique to strain gradient damage theory [24, 37]. Furthermore, this framework was extended to Kirchhoff-Love shells by L. Noels et al., first with linear elasticity assumption [27] and in the second time to the nonlinear range [26] that has been combined with extrinsic cohesive law to extend this formulation to fracture mechanics problems [9, 10, 11].

Nitsche methods can also be useful for hp-adaptive meshes, even if it appears that this technique is commonly used for fluid mechanics [14] and is less developed for elliptic equations. Indeed, hp-adaptivity includes the local refinement of the mesh with elements not necessarily of the same order yielding hanging nodes. The enforcement of continuity through elements becomes an issue. Several continuous techniques exist [12, 13, 15] but the Nitsche methods are very appealing in this case as the weak enforcement of continuity at interfaces does not require element of the same order nor conforming meshes [22, 35, 34]. Nevertheless all the Nitsche developments for hp-adaptive meshes are still based on the fact the starting mesh (i.e. the mesh without adaptation) is a continuous mesh. This differs from the present technological advancement where the recourse to an integration-based approach removes the constraint of finding an underlying continuous mesh.

One interesting feature appears when using Nitsche methods in combination with the cohesive zone theory, especially to solve dynamic fragmentation or crack propagation problems can be obtained by coupling the Nitsche method and the extrinsic cohesive approach. Indeed, the major difficulty is the insertion of the cohesive elements at the onset of fracture. Nevertheless, as interface elements are naturally present for the mesh in the Nitsche method, this interface element can be very easily replaced by a cohesive one when a fracture criterion is reached. Such a framework has been pioneered by J. Mergheim et al. [23], R. Radovitzky et al. [31, 33] and M. Prechtel et al. [30].

Recent interests have also focused on using Nitsche methods to prescribed contact between two free surfaces [4, 5, 6]. This has 2 main advantages: it accounts for a frictional contact that follows from the interface flux naturally present in the Nitsche methods without having to perform any additional treatment; and Nitsche methods use drastically reduced values of the penalty coefficient to enforce the non-interpenetration contact constraint leading to better convergence properties than a classical pure penalty method for contact enforcement.

Finally, R. Abedi et al. [1, 2, 3] developed a space-time discontinuous Galerkin method for 2D elasto-dynamic problems. Their method respects energetic balance for linear and angular momentum over every space-time element and is well designed to capture shock wave without spurious oscillations. They coupled their method with an extrinsic cohesive law to model crack propagation and used an unstructured space time grid which is refined near the crack tip. Mesh independent crack propagation and convergence of crack path were observed with the refinement. Therefore, their method is very accurate and efficient. Nevertheless it is very difficult to implement in a standard Finite Element code as the usual time integration procedure has to be replaced by a more complicated space-time grid integration.

Initially, the classical Nitsche formulation is introduced and then how the present technological advancement deviates from that is explained. The present technological advancement can be applied independently of the physics, therefore to be as general as possible we consider a field u which can represent different quantities depending on the solved physics. For example in the case of linear elasticity for solid mechanics, the field u is the 2nd-order Cauchy stress tensor $\sigma$, while in the case of porous media flow the vectorial field u is the vectorial flow velocity. The strong form of the problem reads, $$\nabla \cdot u = rhs \quad (1)$$

wherein rhs is the right hand side of the equation. By way of example the right hand side corresponds to the external forces for solid mechanics.

For-simplicity in the following developments, and without loss of generality, we consider rhs=0, as the right hand side of equation 1 follow exactly the development of the classical Finite Elements method. Given w the conjugate field to u and $\delta\omega$ its virtual variation, the variational weak form of the problem reads, $$\int_\Omega \nabla \cdot \underline{u} \circ \delta\omega d\Omega = 0 \quad (2)$$

where $\Omega$ is the volume of the domain on which the equation is solved, and $\omega$ is the conjugate field to u. For linear elasticity, $\omega$ is the Cauchy strain tensor $\varepsilon$, while for Darcy flow $\omega$ is the scalar pressure field. To account for the difference in dimension of $\omega$, depending on the physics being solved we use $\circ$ as an operator between u and w. For the solid mechanics equation $\circ$ is equal to the contracted product for volume integral and the scalar dot product for surface integrals, while it is equal to a dot product for volume integrals and to a unit multiplication for surface integrals in the case of the Darcy flow equation. If the equation 1 is linearized, a relationship can be written between the field u and its conjugate field, i.e. a relationship can be written between both quantities as, $$u = \mathcal{A}_\omega \quad (3)$$

where the dimension of the operator $\mathcal{A}$ is equal to the product of the dimension of u and $\omega$. For example in the case of solid mechanics this relation is $$\sigma = \mathcal{H} : \varepsilon \quad (4)$$

with $\mathcal{H}$ being the $4^{th}$ order Hooke tensor. For Darcy flow $\mathcal{A}$ is reduced to a scalar as $$v = \frac{\mathcal{K}}{\mu}(\nabla p) \quad (5)$$

where $v$ is the fluid velocity, $\mathcal{K}$ is the $2^{nd}$ order permeability tensor, p is pressure, and $\mu$ is the fluid viscosity. Note that for simplicity, but without loss of generality, the gravity effect is neglected in the Equation (5).

Equation (2) is further developed with an integration by parts and using the Gauss theorem it comes, $$\int_\Omega \delta \nabla \omega d\Omega - \int_\Gamma u \cdot n \circ \delta \omega d\Gamma = 0 \quad (6)$$

where $\Gamma$ is the boundary of the domain $\Omega$ and n is the outer normal to the surface $\Gamma$. The virtual field $\delta\omega$ has as property $\delta\omega=0$ for every point on the boundary $\Gamma$, therefore in the case of classical Finite Element method the Equation (7) reduces to $$\int_\Omega u \circ \delta \nabla \omega d\Omega = 0 \quad (7)$$

In the case of classical Nitsche formulations, $\Omega$ is discretized in elements before applying the integration by parts and the Gauss theorem. In this case, the Equation (7) reads, $$\sum_e \int_{\Omega_e} u \circ \delta \nabla \omega d\Omega_e - \sum_s \int_{\Gamma_s} u \cdot n \circ \delta \omega d\Gamma_s = 0 \quad (8)$$

where $\Sigma e$ represents the sum over the elements while $\Sigma s$ is the sum over the integral on the surface of each of the elements. Note that in the case of the classical Finite Elements method, the continuity of $\delta\omega$ at the inter-element boundaries leads to $\Sigma s=0$ and the equation (7) is recovered. On the contrary, the classical Nitsche methods allow for a discontinuity of $\delta\omega$ at the interface between 2 elements and $\Sigma s$ is not equal 0. Giving $n^R$ the outward normal of the element at the left of an interface and the jump operator $$[[a]]=(a^L-a^R),$$

where a is a generic quantities on which the jump operator is applied. The equation (8) becomes, $$\sum_e \int_{\Omega_e} u \circ \delta \nabla \omega d\Omega_e - \sum_s \int_{\Gamma_s} [\![u \circ \delta \omega]\!] \cdot n^R d\Gamma_s = 0 \quad (9)$$

The main idea of the Nitsche methods is then to develop $[\![u \circ \delta\omega]\!]$ as, $$[\![u \circ \delta \omega]\!] = \langle u \rangle \circ [\![\delta \omega]\!] - [\![u]\!] \circ \langle \delta \omega \rangle \quad (10)$$

where the mean operator $\langle a \rangle = \frac{1}{2}(a^L+a^R)$ has been introduced. Another averaging operator could be used without any modification to the method. If the exact solution of the problem is injected in equation (10), the identity $[\![u^{exact}]\!]=0$ holds and the first term is equal to 0. Therefore, the left hand side of the equation (9) can be written as $$\sum_s \int_{\Gamma_s} [\![u \circ \delta \omega]\!] \cdot n^R d\Gamma_s \rightarrow \sum_s \int_{\Gamma_s} \langle u \cdot n^R \rangle \circ [\![\delta \omega]\!] d\Gamma_s \quad (11)$$

while the consistency of the methods is preserved by $[\![u^{exact}]\!]=0$. It is worth mentioning that while the Nitsche methods preserve the consistency, the left and right hand sides of equation (11) are not equivalent. The Nitsche form of the problem reads, $$\sum_e \int_{\Omega_e} u \circ \delta \nabla \omega d\Omega_e - \sum_s \int_{\Gamma_s} \langle u \cdot n^R \rangle \circ [\![\delta \omega]\!] d\Gamma_s = 0 \quad (12)$$

While preserving the consistency this equation does not guarantee the continuity of the solution at the inter element boundaries. Toward this end an additional penalty term $$\sum_s \int_{\Gamma_s} \langle \delta u \cdot n^R \rangle \circ [\![\omega]\!] d\Gamma_s = 0 \quad (13)$$

is introduced in (12). This particular form of the penalty term is chosen as it has the advantage to symmetrize the linearized form of the Equation (12). The introduction of this term does not modify the consistency of the method as $[\![\omega]\!]=0$ for the continuous solution. Finally, as such Nitsche method is unstable, a third quadratic interface term $$\sum_s \int_{\Gamma_s} [\![\omega]\!] \left( \frac{\beta}{h_s} \mathcal{L} \right) [\![\delta \omega]\!] d\Gamma_s = 0 \quad (14)$$

is introduced to ensure the stability. In this equation, $\beta$ is a stability parameter following, $\beta>1$, and is a user choice (see [4], as references on suitable values for $\beta$), $h_S$ is a characteristic size of the problem, as for example the smallest distance between 2 nodes in the 2 neighboring elements, and $\mathcal{L}$ scales the stability terms based on the physics. For solid mechanics $\mathcal{L}$ can be chosen as the Young modulus while for Darcy flow $\mathcal{L}$ can be chosen as $$n^R \cdot \frac{\kappa}{\mu} \cdot n^R.$$

It is worth mentioning that for the solid mechanics case, a more complicated form of the stability term, preserving the optimal convergence rate, can be used $$\sum_s \int_{\Gamma_s} [\![\omega]\!] \otimes n^R : \left( \frac{\beta}{h_s} \mathcal{H} \right) : [\![\delta \omega]\!] \otimes n^R d\Gamma_s \quad (15)$$

but this form does not allow a uniform derivation of the equations also valid for the Darcy flow.

The final form of the Nitsche method is then, $$\sum_e \int_{\Omega_e} u \circ \delta \nabla \omega d\Omega_e - \sum_s \int_{\Gamma_s} \langle u \cdot n^R \rangle \circ [\![\delta \omega]\!] d\Gamma_s + \\ \eta \sum_s \int_{\Gamma_s} \langle \delta u \cdot n^R \rangle \circ [\![\omega]\!] d\Gamma_s + \sum_s \int_{\Gamma_s} [\![\omega]\!] \left( \frac{\beta}{h_s} \mathcal{L} \right) [\![\delta \omega]\!] d\Gamma_s = 0 \quad (16)$$

where $\eta$ is a Boolean value. Indeed as the stabilization term also ensure weakly the continuity this term can be turn off leading to an unsymmetric formulation in such a case.

The new Nitsche method is based on the same kind of derivation but the main difference is the application of the method on the equation before the discretization but considering that there are in the domain some locations where the variational field δω will be discontinuous. The discontinuity at those locations will be later the result of a different discretization on both sides of the surface Γ. Therefore, developing Equation (2) by integrating by parts and using the Gauss theorem it comes, $$\int_\Omega u \circ \delta \nabla \omega d\Omega - \int_\Gamma \langle u \cdot n^R \rangle \circ [\![\delta\omega]\!] d\Gamma = 0 \quad (17)$$

This equation is then rewritten by separating the interface Γ in its left $\Gamma^L$ and right $\Gamma^R$ sides, by developing the jump operator $$\int_\Omega u \circ \delta \nabla \omega d\Omega - \int_{\Gamma^L} \langle u \cdot n^R \rangle \circ \delta \omega^L d\Gamma^L - \int_{\Gamma^R} \langle u \cdot n^R \rangle \circ \delta \omega^R d\Gamma^R = 0 \quad (18)$$

This equation leads to a consistent formulation although the continuity through the interface Γ is not guaranteed. Toward this end as previously a penalty term, symmetrizing the formulation in the linear range, is considered $$\int_\Gamma \langle \delta u \cdot n^R \rangle \circ [\![\omega]\!] d\Gamma = 0 \quad (19)$$

The same split of the integral, applied this time on the mean operator, is then considered leading to the new form of the compatibility term, $$\tfrac{1}{2}\int_{\Gamma^L} \delta u^L \cdot n^R \circ [\![\omega]\!] d\Gamma^L + \tfrac{1}{2}\int_{\Gamma^R} \delta u^R \cdot n^R \circ [\![\omega]\!] d\Gamma^R = 0 \quad (20)$$

Finally, following the same procedure the final form of our stabilization form reads, $$\int_{\Gamma^L} [\![\omega]\!] \left(\frac{\beta}{h_s}\mathcal{L}\right) \delta\omega^L d\Gamma^L - \int_{\Gamma^R} [\![\omega]\!] \left(\frac{\beta}{h_s}\mathcal{L}\right) \delta\omega^R d\Gamma^R = 0 \quad (21)$$

In this new Nitsche method the unconformity at the interface can lead to ill-conditioned matrix if the classical average method is used to compute $$\langle u \cdot n^R \rangle \text{ or } \left(\frac{\beta}{h_s}\mathcal{L}\right).$$

This issue can be overcome for example by evaluating $$\langle u \cdot n^R \rangle \text{ and } \left(\frac{\beta}{h_s}\mathcal{L}\right)$$

using a weighted average method following the reasoning of [4,5]. Nitsche methods allow for different ways of computing the average operator at the interface and our extension inherits from this property. Therefore changing the average operator would not result in a modification of the presented method.

Equations (18), (20) and (21) are then combined to obtain the new Nitsche formulation, $$\int_\Omega u \circ \delta \nabla \omega d\Omega - \int_{\Gamma^L} \langle u \cdot n^R \rangle \circ \delta\omega^L d\Gamma^L - \int_{\Gamma^R} \langle u \cdot n^R \rangle \circ \delta\omega^R d\Gamma^R + \quad (22)$$

$$\tfrac{1}{2}\int_{\Gamma^L} \delta u^L \cdot n^R \circ [\![\omega]\!] d\Gamma^L + \tfrac{1}{2}\int_{\Gamma^R} \delta u^R \cdot n^R \circ [\![\omega]\!] d\Gamma^R +$$

$$\int_{\Gamma^L} [\![\omega]\!] \left(\frac{\beta}{h_s}\mathcal{L}\right) \delta\omega^L d\Gamma^L - \int_{\Gamma^R} [\![\omega]\!] \left(\frac{\beta}{h_s}\mathcal{L}\right) \delta w^R d\Gamma^R = 0$$

A classical discretization into elements can then be performed and is omitted by simplicity. The split of the interface allows for a different discretization on both sides therefore there is not a need for a conformity of the integration points situated on both sides. In practice we integrate both sides independently. When integrating the left side the corresponding location on the right one is determined and then the needed quantities are computed at that location in order to determine the mean and jump operators appearing in the Equations (18, 19 and 21).

Equation (31) can be particularized to the linear elastic solid mechanics case with, $$u = \sigma \quad (23)$$
$$\sigma = \mathcal{H} : \in \quad (24)$$
$$\delta u = \mathcal{H} : \delta\in \quad (25)$$
$$\in = \nabla\varphi \quad (26)$$

where φ is the vertical displacement field. These definitions (23-26) lead to, $$\int_\Omega \sigma : \delta\nabla\varphi d\Omega - \int_{\Gamma^L} \langle \sigma \cdot n^R \rangle \cdot \delta\varphi^L d\Gamma^L - \quad (27)$$

$$\int_{\Gamma^R} \langle \sigma \cdot n^R \rangle \cdot \delta\varphi^R d\Gamma^R + \tfrac{1}{2}\int_{\Gamma^L} \mathcal{H}^L : \delta\nabla\varphi^L \cdot n^R \cdot [\![\varphi]\!] d\Gamma^L +$$

$$\tfrac{1}{2}\int_{\Gamma^R} \mathcal{H}^R : \delta\nabla\varphi^R \cdot n^R \cdot [\![\varphi]\!] d\Gamma^R + \int_{\Gamma^L} [\![\varphi]\!] \otimes$$

$$n^R : \left(\frac{\beta}{h_s}\mathcal{H}\right) : \delta\varphi^L d\Gamma^L \otimes n^R - \int_{\Gamma^R} [\![\varphi]\!] \otimes$$

$$n^R : \left(\frac{\beta}{h_s}\mathcal{H}\right) : \delta\varphi^R \otimes n^R d\Gamma^R = 0$$

where the stability term (15), preserving the optimal convergence rate is substituted to the stability term of equation (31).

The equation (31) can also be particularized to the Darcy flow problem with, $$u = v \quad (28)$$

$$v = \frac{\tilde{k}}{\mu}(\nabla p) \quad (29)$$

$$\quad (30)$$

leading to, $$\int_\Omega v \cdot \delta\nabla p d\Omega - \int_{\Gamma^L} \langle v \cdot n^R \rangle \cdot \delta p^L d\Gamma^L - \quad (31)$$

-continued $$\int_{\Gamma^R} \langle v \cdot n^R \rangle \cdot \delta p^R d\Gamma^R + \frac{1}{2} \int_{\Gamma^L} \left(\frac{\mathcal{K}}{\mu}\right)^L \delta \nabla p^L \cdot n^R \cdot [\![p]\!] d\Gamma^L +$$

$$\frac{1}{2} \int_{\Gamma^R} \left(\frac{\mathcal{K}}{\mu}\right)^R \delta \nabla p^R \cdot n^R [\![p]\!] d\Gamma^R + \int_{\Gamma^L} [\![p]\!] \left(\frac{\beta n^R \cdot \mathcal{K} \cdot n^R}{\mu h_s}\right) \delta p^L d\Gamma^L -$$

$$\int_{\Gamma^R} [\![p]\!] \left(\frac{\beta n^R \cdot \mathcal{K} \cdot n^R}{\mu h_s}\right) \delta p^R d\Gamma^R = 0$$

In step 105, the results of the simulation can be used to manage hydrocarbons, which can include hydrocarbon exploration, hydrocarbon development hydrocarbon operations, and hydrocarbon production. The better one understands the reservoir, the better positioned they are to optimize its lifetime performance.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$) and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models and determining the likely locations for hydrocarbon reservoirs within the subsurface. The measurement data may include seismic data, gravity data, magnetic data, electromagnetic data and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production; determining and planning equipment to be utilized and techniques to be utilized in extracting the hydrocarbons from the subsurface formation and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, "subsurface model" refers to a reservoir model, geomechanical model, watertight model and/or a geologic model. The subsurface model may include subsurface data distributed within the model in two-dimensions (e.g., distributed into a plurality of cells, such as elements or blocks), three-dimensions (e.g., distributed into a plurality of voxels) or three or more dimensions.

As used herein, "geologic model" is three-dimensional model of the subsurface region having static properties and includes objects, such as faults and/or horizons, and properties, such as facies, lithology, porosity, permeability, or the proportion of sand and shale.

As used herein, "reservoir model" is a three-dimensional or two-dimensional model of the subsurface that in addition to static properties, such as porosity and permeability, also has dynamic properties that vary over the timescale of resource extraction, such as fluid composition, pressure, and relative permeability.

Figure 10:
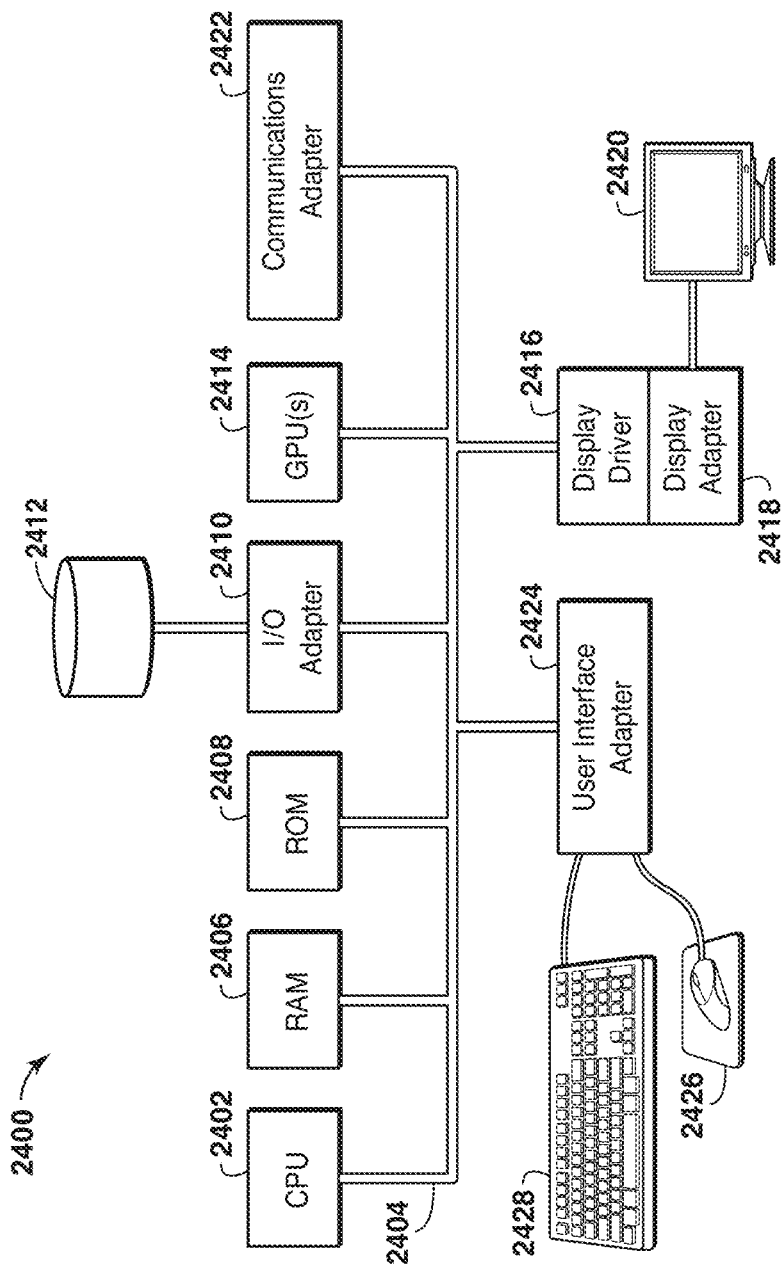
FIG. 10 illustrates a computer system that can execute the present technological advancement.

FIG. 10 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 10, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, clusters, and multiprocessor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following documents are hereby incorporated by reference in their entirety:
[1] Abedi, R., Haber, R., and Alix, O., Spacetime Damage-Delay Cohesive Model for Elastodynamic Fracture with Riemann Contact Conditions, in IV European Conference on Computational Mechanics (ECCM2010) (15-21 May 2010), pp. 1-2;
[2] Abedi, R., Hawker, M., Haber, R., and Matouscaron, K., An adaptive spacetime discontinuous galerkin method for cohesive models of elastodynamic fracture, International Journal for Numerical Methods in Engineering Vol. 81, Issue 10 (2010), pp. 1207-1241;
[3] Abedi, R., Petracovici, B., and Haber, R., A space-time discontinuous galerkin method for linearized elastodynamics with element-wise momentum balance, Computer Methods in Applied Mechanics and Engineering Vol. 195, Issues 25-28 (2006), pp. 3247-3273;
[4] Annavarapu, C., Hautefeuille, M., and Dolbow, J. E., A nitsche stabilized finite element method for frictional sliding on embedded interfaces. Part II: Intersecting interfaces, Computer Methods in Applied Mechanics and Engineering Vol. 267 (2013), pp. 318-341;
[5] Annavarapu, C., Hautefeuille, M., and Dolbow, J. E., A nitsche stabilized finite element method for frictional sliding on embedded interfaces. Part I: Single interface, Computer Methods in Applied Mechanics and Engineering Vol. 268 (2014), pp. 417-436;
[6] Annavarapu, C., Settgast, R. R., Johnson, S. M., Fu, P., and Herbold, E. B., A weighted nitsche stabilized method for small-sliding contact on frictional surfaces, Computer Methods in Applied Mechanics and Engineering Vol. 283 (2015), pp. 763-781;
[7] Arnold, D. N., An interior penalty finite element method with discontinuous elements, SIAM Journal on Numerical Analysis Vol. 19, Issue 4 (1982), pp. 742-760;
[8] Baker, G., Finite element methods for elliptic equations using nonconforming Elements, Mathematics of Computation Vol. 31 (1977), pp. 45-59;
[9] Becker, G., Numerical simulations of brittle and elasto-plastic fracture for thin structures subjected to dynamic loadings/Simulations numeriques de la rupture fragile et elasto-plastique de structures minces sous chargements dynamiques, PhD thesis, 2012;
[10] Becker, G., and Noels, L., A full discontinuous galerkin formulation of nonlinear kirchhov-love shells: elasto-plastic finite deformations, parallel computation & fracture applications, International Journal for Numerical Methods in Engineering submitted (2012);
[11] Becket, G., and Noels, L., Validation tests of the full discontinuous galerkin/extrinsic cohesive law framework of Kirchhoff-Love shell, International Journal of Fracture CFRAC2011, November 2012, Vol. 178, Issues 1-2, pp. 299-322;
[12] Bernardi, C., Asymptotic and Numerical Methods for Partial Differential Equations with Critical Parameters, Kaper, Garbey, Pieper, Eds., NATO ASI Series, Series C: Mathematical and Physical Sciences, Vol. 382 (1993), pp. 1-372;
[13] Bernardi, C., Debit, N., and Maday, Y., Coupling finite element and spectral methods: First results, Mathematics of Computation Vol. 54, Number 189 (January 1990), pp. 21-39;
[14] Bey, K. S., and Oden, J. T., Hp-version discontinuous galerkin methods for hyperbolic conservation laws, Computer Methods in Applied Mechanics and Engineering Vol. 133, Issues 3-4 (1996), pp. 259-286;
[15] Brezzi, F., and Fortin, M. Mixed and hybrid finite element methods, Springer-Verlag New York, Inc., New York, N.Y., USA, 1991, pp. 78-87; 135-154; and 167-205.
[16] Cockburn, B., Discontinuous Galerkin methods, ZAMM—Journal of Applied Mathematics and Mechanics/Zeitschrift far Angewandte Mathematik and Mechanik 83, 11 (2003), pp. 731-754;
[17] Cockburn, B., and Shu, C.-W., Runge-kutta discontinuous Galerkin methods for convection-dominated problems, Journal of Scientific Computing Vol. 16, Issue 3 (2001), pp. 173-261;
[18] Douglas, J., H1-galerkin methods for a nonlinear dirichlet problem. In Mathematical Aspects of Finite Element Methods, I. Galligani and E. Magenes, Eds., Vol. 606 of Lecture Notes in Mathematics. Springer Berlin/Heidelberg, 1977, pp. 64-86;
[19] Douglas, J., and Dupont, T., Interior penalty procedures for elliptic and parabolic galerkin methods, In Computing Methods in Applied Sciences, R. Glowinski and J. Lions, Eds., Vol. 58 of Lecture Notes in Physics. Springer Berlin/Heidelberg, 1976, pp. 207-216;
[20] Engel, G., Garikipati, K., Hughes, T. J. R., Larson, M. G., Mazzei, L., and Taylor, R. L., Continuous/discontinuous finite element approximations of fourth-order elliptic problems in structural and continuum mechanics with applications to thin beams and plates, and strain gradient elasticity, Computer Methods in Applied Mechanics and Engineering, Vol. 191, Issue 34 (2002), pp. 3669-3750;
[21] Hansbo, P., and Larson, M. G., A discontinuous galerkin method for the plate equation-Calcolo, Vol. 39, Issue 1 (2002), pp. 41-59;
[22] Houston, P., Schotzau, D., and Wihler, T. P., An hp-adaptive mixed discontinuous Galerkin FEM for nearly incompressible linear elasticity, Computer Methods in Applied Mechanics and Engineering Vol. 195, Issues 25-28 (2006), pp. 3224-3246;

[23] Mergheim, J., Kuhl, E., and Steinmann, P., A hybrid discontinuous Galerkin/interface method for the computational modelling of failure, Communications in Numerical Methods in Engineering, Vol. 20, Issue 7 (2004), pp. 511-519;

[24] Molari, L., Wells, G. N., Garikipati, K., and Ubertini, F., A discontinuous galerkin method for strain gradient-dependent damage: Study of interpolations and convergence. Computer Methods in Applied Mechanics and Engineering, Vol. 195, Issues 13-16 (2006), pp. 1480-1498;

[25] Nitsche, J. Uber ein Variationsprinzip zur Losung von Dirichlet-Problemen bei Verwendung von Teilraumen, die keinen Randbedingungen unterworfen sind, Abh. Math. Sem. Univ. Hamburg 36 (1971), pp. 9-15;

[26] Noels, L. A discontinuous galerkin formulation of non-linear kirchhov-love shells, International Journal for Numerical Methods in Engineering, Vol. 78, Issue 3 (2009), pp. 296-323;

[27] Noels, L., and Radovitzky, R., A new discontinuous galerkin method for kirchhov-love shells, Computer Methods in Applied Mechanics and Engineering, Vol. 197, Issues 33-40 (2008), pp. 2901-2929;

[28] Percell, P., and Wheeler, M. F., A local residual finite element procedure for elliptic equations, SIAM Journal on Numerical Analysis, Vol. 15, No. 4 (1978), pp. 705-714;

[29] Pian, T. H. H., and Tong, P. Basis of finite element methods for solid continua, International Journal for Numerical Methods in Engineering, Vol. 1, Issue 1 (1969), pp. 3-28;

[30] Prechtel, M., Ronda, P., Janisch, R., Hartmaier, A., Leugering, G., Steinmann, P., and Stingl, M., Simulation of fracture in heterogeneous elastic materials with cohesive zone models, International Journal of Fracture, Vol. 168, Issue 1 (2011), pp. 15-29;

[31] Radovitzky, R., Seagraves, A., Tupek, M., and Noels, L., A scalable 3d fracture and fragmentation algorithm based on a hybrid, discontinuous galerkin, cohesive element method, Computer Methods in Applied Mechanics and Engineering Vol. 200, Issues 1-4 (1 Jan. 2011), pp. 326-344;

[32] Reed, W., and Hill, T., Triangular mesh methods for the neutron transport equation, In Conference: National topical meeting on mathematical models and computational techniques for analysis of nuclear systems, Ann Arbor, Mich., USA, 8 Apr. 1973; Other Information: Orig. Receipt Date: 31-DEC-73 (1973).

[33] Seagraves, A., and Radovitzky, R., Advances in cohesive zone modeling of dynamic fracture. In Dynamic Failure of Materials and Structures, A. Shukla, G. Ravichandran, and Y. D. Rajapakse, Eds. Springer US, 2010, pp. 349-405,

[34] Truster, T. J., Chen, P., and Masud, A., Finite strain primal interface formulation with consistently evolving stabilization. International Journal for Numerical Methods in Engineering Vol. 102, Issues 3-4 (20-27 Apr. 2015), pp. 278-315,

[35] Truster, T. J., and Masud, A., Primal interface formulation for coupling multiple pdes: a consistent derivation via the variational multiscale method, Computer Methods in Applied Mechanics and Engineering Vol. 268 (1 Jan. 2014), pp. 194-224;

[36] Wells, G. N., and Dung, N. T., A C.° discontinuous Galerkin formulation for Kirchhoff plates, Computer Methods in Applied Mechanics and Engineering Vol. 196, Issues 35-36 (15 Jul. 2007), pp. 3370-3380;

[37] Wells, G. N., Garikipati, K., and Molari, L., A discontinuous Galerkin formulation for a strain gradient-dependent damage model. Computer Methods in Applied Mechanics and Engineering Vol. 193, Issues 33-35 (20 Aug. 2004), pp. 3633-3645; and

[38] Wheeler, M. F., An elliptic collocation-finite element method with interior penalties, SIAM Journal on Numerical Analysis Vol. 15, Issue 1 (1978), pp. 152-161.

What is claimed is:

1. A method for modeling a subsurface reservoir system, the method comprising:
generating, with a computer, a background mesh that does not honor at least one subsurface feature included in the subsurface reservoir system;
splitting, with a computer, the background mesh along the subsurface feature included in the subsurface reservoir system such that a resulting mesh honors a geometry of the subsurface features;
identifying, with a computer, element faces or edges where the resulting mesh is non-conforming and/or the element faces or edges lie on subsurface features; and
performing a computer-based numerical simulation utilizing the resulting mesh to model at least one fluid-related or geomechanical reservoir response, wherein mass or traction balance is enforced on the identified element faces or edges.

2. The method of claim 1, wherein the non-conforming mesh is generated from the splitting of the background mesh.

3. The method of claim 1, further comprising performing surface integration to ensure mass or traction balance on the identified element faces or edges, and the surface integration is performed by separating the surface integration of an interface between two sides of the identified element faces or edges into two parts, one for each side of the interface, and on each side of the interface, the surface integration follows its own discretization without any considerations for the other side's discretization.

4. The method of claim 3, wherein the non-conforming mesh can include at least one hanging node on different sides of the interface, and at the identified element faces or edges the integration can be performed in order to account for a presence of the at least one hanging node.

5. The method of claim 1, wherein after the splitting, inserting additional elements with different material properties between two sides of a split in the resulting mesh at a surface of the subsurface feature.

6. The method of claim 1, wherein after the splitting, inserting additional elements with different material properties within the resulting mesh at a location of a one-dimensional subsurface feature.

7. The method of claim 6, wherein the material properties are permeability and porosity for a fluid flow problem, and constitutive relations for a geomechanical problem.

8. The method of claim 1, wherein the at least one fluid-related reservoir response is determination of fluid flow through a permeable rock formation.

9. The method of claim 1, wherein the subsurface feature is at least one of a perforation from a wellbore, fracture wings of a fractured wellbore completion, or wormholes.

10. The method of claim 1, wherein the subsurface feature is at least one of a fault, natural fractures, a thin reservoir layer, or formation stratification.

11. The method of claim 1, wherein the simulation accounts for a discontinuity at the identified edges or faces with a Nitsche method.

12. The method of claim 1, further comprising managing hydrocarbons based on a result of the simulation.

13. The method of claim 4, wherein the interface is between high and low permeability regions of source rock.

14. The method of claim 1, wherein the splitting is according to subsurface features.

15. The method of claim 1, wherein the splitting is according to local grid refinement.

16. A non-transitory computer readable storage medium encoded with instructions, which when executed by a computer causes the computer to implement a method for modeling a subsurface reservoir system, the method comprising:

generating, with a computer, a background mesh that does not honor at least one subsurface feature included in the subsurface reservoir system;

splitting, with a computer, the background mesh along the subsurface feature included in the subsurface reservoir system such that a resulting mesh honors a geometry of the subsurface features;

identifying, with a computer, element faces or edges where the resulting mesh is non-conforming and/or the element faces or edges lie on subsurface features; and performing a computer-based numerical simulation utilizing the resulting mesh to model at least one fluid-related or geomechanical reservoir response, wherein mass or traction balance is enforced on the identified element faces or edges.

* * * * *